United States Patent

Kline

[15] 3,676,587

[45] July 11, 1972

[54] TELEVISION CAMERA OVEREXPOSURE WARNING SYSTEM

[72] Inventor: Donald D. Kline, Palo Alto, Calif.

[73] Assignee: Commercial Electronics, Inc., Mountain View, Calif.

[22] Filed: Aug. 27, 1970

[21] Appl. No.: 67,454

[52] U.S. Cl. ....................178/7.2, 178/7.1

[51] Int. Cl. ....................H04n 5/21, H04n 5/34

[58] Field of Search ....................178/DIG. 29, DIG. 34, 7.1, 178/7.2, 7.92, DIG. 4

[56] References Cited

UNITED STATES PATENTS

| | | | |
|---|---|---|---|
| 3,525,805 | 8/1970 | Busby, Jr. | 178/7.1 |
| 3,330,907 | 7/1967 | Arimura et al. | 178/7.1 X |
| 3,435,136 | 3/1969 | Bachmann et al. | 178/7.2 X |
| 3,541,250 | 11/1970 | Webb | 178/7.1 |

*Primary Examiner*—Robert L. Richardson
*Attorney*—Townsend and Townsend

[57] ABSTRACT

A television camera overexposure warning system in which those portions of the television image which exceed a desired level of illumination of the television camera tube are caused to blink at a visible rate on the screen of the television camera viewfinder or monitor. This is accomplished by providing a threshold detector which produces an electrical signal when the amplified output signal of the camera tube exceeds a level corresponding to the maximum desired level of illumination and a gate which couples an oscillator to the viewfinder finder or monitor video input in response to the electrical signal produced by the threshold detector. In a color television camera, threshold detectors may be provided for each of the camera tubes and associated video channels or a single threshold detector may be employed in association with one of the video channels, preferably the video channel produced by the green camera tube.

4 Claims, 1 Drawing Figure

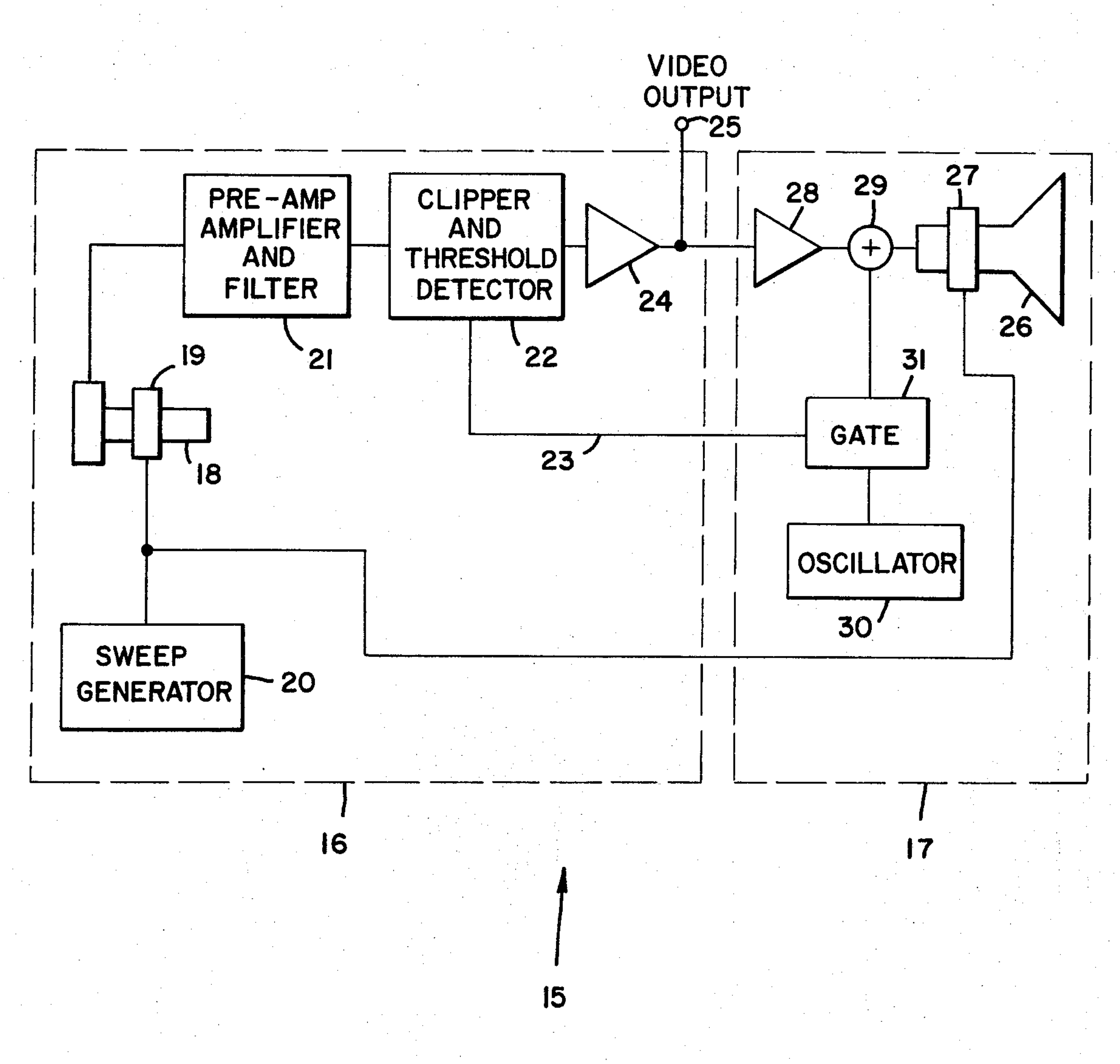
VIDEO
OUTPUT
25
PRE-AMP
AMPLIFIER
AND
FILTER
CLIPPER
AND
THRESHOLD
DETECTOR
24
28
29
27
26
21
22
19
18
31
GATE
23
OSCILLATOR
30
SWEEP
GENERATOR
20
16
17
15

TELEVISION CAMERA OVEREXPOSURE WARNING SYSTEM

This invention relates to a television camera overexposure warning system.

In a television camera, it is necessary to control the amount of light incident upon the camera tube in order to prevent damage or destruction of same. This is generally accomplished by controlling the camera lens opening or aperture through the use of a servo controlled iris. The servo controlled iris is generally operated by a technician who observes the video output signals from the camera on a wave form monitor and controls the iris to achieve a desired voltage level output from the camera. Since television cameras generally do not provide a wave form display, it has heretofore been extremely difficult, if not for all intents and purposes impossible, for the cameraman to control the aperture or lens opening of the camera.

It is thus an object of the present invention to provide an overexposure warning system for a television camera which enables the cameraman to control the camera lens aperture.

Another object of the present invention is to provide an overexposure warning system for television cameras which provides the cameraman with an indicia of the incidence of an excessive amount of light on the camera tube.

Still another object of the present invention is to provide a television camera overexposure warning system in which the excessively bright portions of the television picture are blinked at a visible rate on the television camera viewfinder or monitor, so as to enable the cameraman to control the lens aperture accordingly.

These objects are met in accordance with the present invention by providing a threshold detector circuit which produces a signal when the television camera video signal exceeds a predetermined level, which level preferably corresponds to an excessive amount of light incident upon the television camera tube. Preferably, the threshold detector circuit may be added to an output clipper circuit generally present in television cameras. The monitor or viewfinder portion of the television camera includes an oscillator and a gate responsive to the output signal of the threshold detector for coupling the oscillator signal to the video signal displayed on the monitor or viewfinder in response to the threshold detector signal. In this manner, those portions of the television image which exceed the desired level of camera tube illumination will visibly appear to blink at the oscillator rate in the television viewfinder or monitor display. Accordingly, the cameraman may adjust the aperture of the camera lens to eliminate blinking, and thus to reduce the amount of light incident upon the television camera tube to a safe level.

It is thus apparent that such a television camera overexposure warning system is advantageous in that it permits the cameraman to readily control the lens aperture without the need for additional equipment, such as a wave form display, while not interfering with the conventional operation of the camera. Accordingly, the television camera overexposure warning system according to the present invention may reduce the manpower and equipment employed to control the television camera lens aperture, thus simplifying and improving television studio operations.

These and other objects, features and advantages of the present invention will be more readily apparent from the following detailed description of the present invention, with reference to the accompanying drawing, wherein there is shown a block diagram of a television camera incorporating the television camera overexposure warning system according to the present invention.

Referring to the drawing, there is shown a television camera 15 having a camera portion 16 and a viewfinder or monitor portion 17. Camera portion 16 comprises a television camera tube 18 upon which desired images are optically imaged by a conventional lens system (not shown). The lens system associated with camera tube 18 preferably includes a servo controlled iris which the cameraman may operate to control the amount of light incident upon camera tube 18 in a manner to be described hereinafter.

A deflection coil 19 is disposed around the neck of camera tube 18 and functions to deflect the beam of camera tube 18 in response to electrical signals produced by a sweep generator circuit 20, applied thereto. Sweep generator circuit 20 and deflection coil 19 cooperate to deflect the beam of cathode ray tube 18 in accordance with the conventional television raster. The target or output of camera tube 18 is connected to the input of a preamp, amplifier and filter circuit 21. Preamp, amplifier and filter circuit 21 comprises conventional video signal processing circuitry.

The output of preamp, amplifier and filter circuit 21 is connected to the input of a clipper and threshold detector circuit 22. Clipper and threshold detector circuit 22 functions to clip or limit the voltage of the video signal applied thereto to a predetermined level, and to produce a signal when the clipping or threshold level is exceeded on a lead 23. Preferably, the clipping and threshold level of clipper and threshold detector circuit 22 corresponds to the video signal level associated with the incidence of the maximum desirable level of illumination of camera tube 18. In this manner, a signal will be produced on lead 23 whenever camera tube 18 is illuminated beyond this predetermined safety level. Furthermore, the clipping action of clipper and threshold detector circuit 22, which functions to limit the voltage level of the video output signal of television camera 15, thus protects equipment connected to the output of television camera 15 from damage due to input voltage overloads. Accordingly, the clipper action of clipper and threshold detector circuit 22 may be deleted without effecting the operation of the television camera overexposure warning system, as will be more readily apparent hereinafter.

The output of clipper and threshold detector circuit 22 is connected to the input of a line driver amplifier 24, the output of which comprises the camera video output, and is thus connected to the video output terminal 25 of television camera 15.

The viewfinder or monitor portion 17 of television camera 15 comprises a cathode ray tube 26 upon which the video output signals of television camera 15 are displayed. In particular, a deflection coil 27 is disposed around the neck of cathode ray tube 26, deflection coil 27 being energized by the electrical signals produced by sweep generator circuit 20, so that the beam of cathode ray tube 26 will scan in synchronism with the beam of camera tube 18. The video output signals of camera portion 16 are connected to the input of an amplifier 28. The output signals of amplifier 28 are applied, via a summing junction 29, to the cathode of cathode ray tube 26, so as to modulate the beam of cathode ray tube 26 in response to the video output signals of camera portion 16, in a conventional manner. Thus, the television images produced by camera portion 16 will be displayed on cathode ray tube 26, cathode ray tube 26 being employed by the cameraman as a viewfinder or monitor, in a conventional manner.

Viewfinder or monitor portion 17 further comprises an oscillator 30, such as an astable multivibrator. Oscillator 30 produces an electrical signal which oscillates at a visible rate, such as two cycles per second. The output of oscillator 30 is connected to the input of a gate 31. Gate 31 functions to apply the output signal of oscillator 30 to summing junction 29, in response to the overexposure signal produced by clipper and threshold detector circuit 22 on lead 23. In particular, gate 31 may comprise a field effect transistor adapted to connect the output of oscillator 30 to summing junction 29 when a signal is present on lead 23. In this manner, the presence of a signal on lead 23 will cause the oscillator signal to be coupled, via summing junction 29, to the cathode of cathode ray tube 26, thus causing the intensity of the beam of cathode ray tube 26 to be modulated thereby, so that cathode ray tube 26 will appear to blink when a signal is present on lead 23.

Since cathode ray tube 26 is scanned in synchronism with camera tube 18, it is apparent that only those portions of the image which exceed the predetermined safety level will be caused to blink on the viewfinder display of cathode ray tube 26. Furthermore, this blinking will appear in the viewfinder or cathode ray tube 26 display only, the video output of the camera being unaffected thereby.

Operation of the television camera 15 according to the present invention is accomplished in a substantially conventional manner. However, the overexposure warning system enables the cameraman to readily control the servo iris. In particular, the cameraman orients and focuses the camera in a conventional manner while observing the viewfinder display on cathode ray tube 26. Of course, the cameraman initially sets the camera lens aperture to a small setting. Thereafter, the cameraman may increase or enlarge the camera lens aperture, while observing the viewfinder display, until certain portions of the image on cathode ray tube 26 appear to blink. As described hereinbefore, these portions will then correspond to the regions of the picture optically imaged on television camera tube 18 which exceed a predetermined safety level of illumination.

The cameraman may then reduce the camera lens aperture so as to substantially eliminate the blinking of cathode ray tube 26, thus reducing the level of illumination of camera tube 18 to a safe level. Alternatively, the cameraman may reorient the camera to remove those images which appear to blink from the field of view of the camera, thus again reducing the level of illumination of camera tube 18 to a safe level.

Such a television camera overexposure warning system is advantageous in that it readily allows the cameraman to control the lens aperture of the camera. Furthermore, the overexposure indicia provided indicates to the cameraman which portions of the television image are excessively bright, which indication would not be provided by a wave form monitor. In addition, the overexposure indicia is incorporated into the viewfinder display, so that the attention of the cameraman will not be distracted from the viewfinder, and thus the normal operation of the camera will be substantially unaffected.

While the present invention has been described with reference to a monochromatic or single camera tube television camera, it is apparent that the present invention is equally applicable to a color or three camera tube television camera. In particular, clipper and threshold detector circuit 22 may be included in one or more of the video channels of a color camera. Since color cameras generally provide a monochromatic monitor, only a single oscillator 30 and gate 31 need be provided, gate 31 being responsive to the plural clipper and threshold detector circuits. Applicant has discovered that the green channel television camera tube of a color television camera is generally overexposed prior to the other camera tubes. Accordingly, applicant has found that a single clipper and threshold detector circuit 22 in the green channel video circuitry will provide satisfactory overexposure warning for a color television camera.

While a particular embodiment of the present invention has been described in detail, it is apparent that modifications and adaptations may be made without departing from the true spirit and scope of the present invention, as set forth in the claims.

What is claimed is:

1. In a television camera having a camera tube, lens means for applying optical images to said camera tube, amplifier means for amplifying the output signals of said camera tube, and viewfinder means for viewing the output signals of said amplifier means, the improvement comprising: threshold detector means for producing an electrical signal when the output of said amplifier means exceeds a predetermined level corresponding to the maximum desired illumination of said camera tube, oscillator means for producing an oscillatory electrical signal at a visible rate, and gate means for applying said oscillatory electrical signal of said oscillator means to said viewfinder means in response to the electrical signal produced by said threshold detector means.

2. In a color television camera having a plurality of camera tubes, lens means optically imaging varying spectral portions of an image on each of said camera tubes, amplifier means for amplifying the output signals of each of said camera tubes, and viewfinder means for viewing the output signals of said amplifier means, the improvement comprising: threshold detector means for producing an electrical signal when the amplified output of a particular one of said camera tubes exceeds a predetermined level corresponding to the maximum desired illumination of said camera tubes, oscillator means for producing an oscillatory electrical signal at a visible rate, and gate means for applying said oscillatory electrical signal of said oscillator means to said viewfinder means in response to the electrical signal produced by said threshold detector means.

3. Apparatus according to claim 2 wherein said particular camera tube has the green spectral portion of said image imaged thereon.

4. In a color television camera having a plurality of camera tubes, lens means optically imaging varying spectral portions of an image on each of said camera tubes, amplifier means for amplifying the output signals of each of said camera tubes, and viewfinder means for viewing the output signals of said amplifier means, the improvement comprising: threshold detector means for producing an electrical signal when the amplified output of any of said camera tubes exceeds a predetermined level corresponding to the maximum desired illumination of said camera tubes, oscillator means for producing an oscillatory electrical signal at a visible rate, and gate means for applying said oscillatory electrical signal of said oscillator means to said viewfinder means in response to the electrical signal produced by said threshold detector means.

* * * * *